United States Patent [19]

Shackelford

[11] 4,297,375

[45] Oct. 27, 1981

[54] SALT SUBSTITUTES HAVING REDUCED BITTERNESS

[75] Inventor: John R. Shackelford, LaGrange, Ill.

[73] Assignee: Standard Oil Company (Indiana), Chicago, Ill.

[21] Appl. No.: 77,562

[22] Filed: Sep. 21, 1979

[51] Int. Cl.³ .............................................. A23L 1/237
[52] U.S. Cl. ..................................... 426/62; 426/650; 426/804; 426/656
[58] Field of Search .................. 426/62, 650, 656, 804

[56] References Cited

U.S. PATENT DOCUMENTS

| | | | |
|---|---|---|---|
| 1,702,303 | 2/1929 | Kahn | 426/62 |
| 1,806,290 | 5/1931 | Griessbach et al. | 426/62 |
| 1,859,250 | 5/1932 | Bertel | 426/62 |
| 2,536,439 | 1/1951 | Grelck | 426/62 |
| 2,742,366 | 4/1956 | Power | 426/806 |
| 2,946,688 | 7/1960 | Rosenthal et al. | 426/62 |
| 3,407,072 | 10/1968 | Aizawa et al. | 426/62 |
| 3,627,539 | 12/1971 | Ishii et al. | 426/62 |
| 3,862,337 | 1/1975 | Osborne | 426/62 |
| 4,066,793 | 1/1978 | Eguchi | 426/650 |
| 4,068,006 | 1/1978 | Moritz | 426/806 |

*Primary Examiner*—Jeanette M. Hunter
*Attorney, Agent, or Firm*—Gregory E. Croft; William T. McClain; William H. Magidson

[57] ABSTRACT

Autolyzed yeast acts to reduce bitterness in foods caused by the presence of potassium chloride-containing salt substitutes.

7 Claims, No Drawings

SALT SUBSTITUTES HAVING REDUCED BITTERNESS

BACKGROUND

The use of sodium salt, namely sodium chloride, has long been suspected as a cause of health problems, particularly hypertension. Although a cause-effect relationship between excessive sodium ingestion and hypertension has apparently not been established, it is known that a reduction of sodium intake alone will accomplish a reduction in the hypertensive state.

With growing consumer awareness and a more active presence by the FDA in the labelling requirements for the use of sodium salts, private industry is now concerned with the amount of sodium chloride they are adding to their food products. Presently many food product manufacturers are adding sodium chloride directly to their food system. In addition, a large percentage of the purchased ingredients used in formulating food products also contain salt (sodium chloride). In some instances, this salt content can be as high as 50% of the food ingredient.

To some degree the problem of high salt levels in foods could be reduced by simply lowering the level of salt added to the food product formulations. But unfortunately the level of salt in most cases cannot be lowered due to preservation requirements and the necessity of from 0.5% to 2.5% salt in the food product for flavor requirements.

To effect a reduction in sodium chloride or the sodium ion, many food processors have employed potassium chloride as a salt substitute. However, potassium chloride is easily discernable from sodium chloride, or table salt, by most humans. In some societies the flavor of potassium chloride is readily accepted, but in the United States, Europe, and Asia the flavor is unacceptable. Although potassium chloride is perceived as being salty, the potassium ion imparts an "off" flavor most often described as bitter. The reason for bitterness perception with potassium salt and not with sodium salt is not generally understood, but the perceptor sites located on the tongue where saltiness is perceived can readily distinguish potassium from sodium and this difference is physiologically perceived as a difference in bitterness intensity. Because of the difference in flavor between potassium chloride and sodium chloride, it is necessary to employ additives in salt substitutes to minimize this flavor difference.

For example, U.S. Pat. No. 3,860,732 (Eisenstadt) teaches a sodium-free salt substitute having reduced bitterness containing potassium chloride in admixture with lactose and/or dextrose and cream of tartar.

U.S. Pat. No. 4,066,799 (Cornelius et al) teaches a sodium chloride salt substitute containing a glycinamide salt in mixture with a flavor potentiator such as glutamic acid, monosodium glutamate, etc.

U.S. Pat. No. 3,782,974 (Lontz et al) teaches a salt substitute formulation containing defined proportions of ascorbic acid, fumaric acid, and citric acid.

U.S. Pat. No. 3,505,082 (Miller) teaches a potassium chloride salt substitute containing a minor proportion of fumaric acid.

In spite of the attention this problem has received, it still exists. It is therefore an object of this invention to provide a potassium-containing salt which has reduced bitterness. This and other objects will be apparent from further reading of this specification.

SUMMARY OF THE INVENTION

It has now been discovered that autolyzed yeast is effective in reducing the bitter flavor imparted by potassium salts. As such, autolyzed yeast can advantageously be used in potassium-containing salt substitutes or in foods which contain potassium salts in order to reduce the bitter flavor. The autolyzed yeast useful in the various aspects of this invention can be prepared in the conventional manner well known in the art. In particular, a slurry or cream of active yeast cells (15–18 weight percent solids) can be plasmolyzed with 2–5 weight percent salt (based on cell dry weight). Ethyl acetate can be added as an antiseptic at 1% by volume to prevent bacterial growth. The slurry can be heated to 50–55° C. and held at that temperature for about 12–24 hours, or until the desired degree of solubilization is achieved. The resulting autolyzed yeast can then be pasteurized, centrifuged, and dried to a powdery product.

A preferred yeast autolyzate can be prepared in the conventional manner as set forth above, but with the addition of an exogenous enzyme such as papain to assist in the yeast cell digestion. The papain is added to the yeast slurry at a concentration of about 0.01 to about 1.0 percent by weight, resulting in a shorter digestion time. Accordingly, for purposes herein, the term "autolyzed yeast" shall include such autolyzed yeasts produced with the aid of exogenous enzymes.

In one particular aspect, the invention resides in a salt substitute containing potassium chloride and an amount of autolyzed yeast effective to reduce the bitterness caused by the potassium chloride.

In another aspect, the invention resides in a food product to which a potassium chloride-containing salt substitute has been added, said food product further containing an amount of autolyzed yeast effective to substantially reduce bitterness caused by the presence of the potassium chloride. For purposes herein, a "food product" is any edible material intended for consumption.

In still another aspect, this invention resides in a method for reducing the bitter flavor of a food product caused by the presence of potassium chloride comprising incorporating an effective amount of autolyzed yeast into the food product to substantially reduce the bitter flavor.

In all aspects of this invention it will be appreciated that the amount of autolyzed yeast necessary to effectively reduce the bitter flavor notes of the potassium chloride will vary greatly from one food system to another. Generally, however, the amount of autolyzed yeast relative to the amount of potassium chloride will be in the range of from about 0.5 percent to about 300 percent. The preferred amounts for each system can be readily determined without undue experimentation.

EXAMPLES

Example 1. Reduction of Bitterness in Potassium Chloride Solutions

A commercially available salt substitute was used as a control against which the effectiveness of several yeast products were tested. The salt substitute was labeled lactose, potassium chloride, glutanic acid, silicon dioxide, potassium citrate, potassium phosphate and monopotassium glutamate. The potassium chloride content was about 45 percent.

Three aqueous suspensions to be tested were prepared as follows on a percentage basis:

|  | Suspension 1 | Suspension 2 | Suspension 3 |
|---|---|---|---|
| Water | 99.0 | 99.0 | 99.0 |
| Torula Yeast[1] | 1.0 | — | — |
| Autolyzed Yeast | — | 1.0 | — |
| Torula Yeast[2] | — | — | 1.0 |
|  | 100.0 | 100.0 | 100.0 |

[1] Spray-dried Torula yeast (*Candida utilis*) fortified with thiamine.
[2] Spray-dried Torula yeast (*Candida utilis*).

Each suspension was initially blended for one minute and briefly blended again prior to being tested.

Four tests samples were formulated having the following compositions on a percentage basis (Sample 1 was the control):

|  | Sample 1 | Sample 2 | Sample 3 | Sample 4 |
|---|---|---|---|---|
| Tap Water | 97.0 | 95.0 | 95.0 | 95.0 |
| Salt Substitute | 3.0 | 3.0 | 3.0 | 3.0 |
| Suspension 1 | — | 2.0 | — | — |
| Suspension 2 | — | — | 2.0 | — |
| Suspension 3 | — | — | — | 2.0 |
|  | 100.0 | 100.0 | 100.0 | 100.0 |

A taste panel of seven trained panelists was formed and asked to rate the solutions for salt strength and level of bitterness perceived on a scale of 1 to 7, with the higher numbers corresponding to increasing bitterness. The results were as follows:

| Sample | Score Value | Description |
|---|---|---|
| SALTINESS | | |
| Autolyzed Yeast (Sample 3) | 5.28 | Very Salty |
| Torula Yeast (Sample 4) | 5.14 | Very Salty |
| Torula Yeast (Sample 2) | 4.71 | Moderately Salty |
| Control (Sample 1) | 4.42 | Moderately Salty |
| BITTERNESS | | |
| Control (Sample 1) | 4.57 | Moderately Bitter |
| Torula Yeast (Sample 2) | 4.28 | Moderately Bitter |
| Torula Yeast (Sample 4) | 4.14 | Moderately Bitter |
| Autolyzed Yeast (Sample 3) | 3.85 | Slightly Bitter |

The results show that whole yeast and autolyzed yeast both increase the saltiness, but the autolyzed yeast was substantially more effective in reducing bitterness.

Example 2. Reduction of Bitterness in Broths

In order to test the effect of autolyzed yeast in a more complex flavor system, a test broth was prepared from the following dry flavor base:

| Dry Flavor Base | |
|---|---|
| Hydrolyzed Vegetable Protein | 41.1% |
| Corn Starch | 26.0 |
| MSG | 22.0 |
| Vegetable Oil | 7.0 |

| Dry Flavor Base | |
|---|---|
| Ground Celery | 2.0 |
| Garlic Powder | 1.0 |
| Ground Turmeric | .9 |
|  | 100.0 |

The dry flavor base was mixed with potassium chloride and water for the control and tested against the same formulation containing autolyzed yeast as follows:

| Usage | Control | Test |
|---|---|---|
| Dry Flavor Base | 2.0gm | 2.0gm |
| Potassium Chloride | 1.2 | 1.2 |
| Autolyzed Yeast | — | .6 |
|  | 3.2gm | 3.8gm |
| Water | 150.0gm | 150.0gm |

A group of seven trained panelists was asked to compare the test and control seasoned broth mixes for bitterness. The test sample was found to contain significantly less bitterness due to potassium chloride than the control.

Example 3. Seasoning For Pan Stuffing With Reduced Bitterness

Pan stuffing was chosen as a highly complex flavor system in which to further test bitterness suppression. A Control and Test seasoning mix were prepared in accordance with the following percentages:

|  | CONTROL | TEST |
|---|---|---|
| Vegetable oil | 5.0 | 5.0 |
| Hydrolyzed vegetable protein | 33.0 | — |
| Autolyzed yeast | — | 31.0 |
| Potassium chloride | — | 14.0 |
| Salt | 10.0 | — |
| Dextrose | 27.5 | 25.5 |
| Ground celery | 5.0 | 5.0 |
| Ground marjoram | 5.0 | 5.0 |
| Onion powder | 5.0 | 5.0 |
| Ground sage | 3.0 | 3.0 |
| Ground turmeric | 2.5 | 2.5 |
| Ground red pepper | 1.0 | 1.0 |
| Ground bay | 1.0 | 1.0 |
| MSG | 2.0 | 2.0 |
|  | 100.0 | 100.0 |

The seasoning mix was used to make the pan stuffing according to the following recipe:

| 11 gm | Seasoning Mix |
| 9 gm | Vegetable Mix** |
| 1.75 cups | water |
| .25 cup | margarine |
| 155 gm | bread crumbs |

**45% dehydrated chopped celery, 40% dehydrated chopped onion, 15% parsley

The stuffing was submitted to over a hundred people who were asked to comment on the effectiveness of autolyzed yeast for suppressing bitterness. The results have shown that the test samples and the controls containing sodium chloride were not significantly identifiable from one another. Hence the bitterness of the test samples containing potassium chloride was effectively suppressed by the autolyzed yeast.

Example 4. Chicken Broth Base

A chicken broth base was prepared with 48 oz. canned chicken broth concentrate and 12 oz. tap water. Potassium chloride was added to two samples and autolyzed yeast was added to one of the two samples as follows on a percentage basis:

|  | Control | Test |
| --- | --- | --- |
| Broth base | 100 | 100 |
| Potassium chloride | .75 | .75 |
| Autolyzed yeast | — | .25 |

Taste evaluation of the broth base indicated that the test sample had significantly less bitterness resulting from potassium chloride than did the control, due to the presence of the autolyzed yeast.

The effectiveness of autolyzed yeast to reduce the bitterness resulting from potassium chloride appears to be influenced by the complexity of the flavor profile of the food system. This is to say that the most elementary flavor profile (water) requires a relatively low level of autolyzed yeast to reduce potassium bitterness. In contrast, a more complex food flavor system such as the pan-prepared bread stuffing mix requires much more autolyzed yeast to reduce potassium bitterness.

By way of summary, the following levels of autolyzed yeast have been found to be necessary to achieve maximum practical levels of bitterness reduction, expressed as parts of autolyzed yeast necessary to reduce the bitterness of one (1) part potassium chloride:

| In water | 0.016 |
| --- | --- |
| In broth | 0.25–0.50 |
| In bread pan stuffing | 2.0–2.25 |

These different levels of autolyzed yeast necessary to be effective in suppressing bitterness in different food systems illustrate the necessity for some routine experimentation to determine the optimum levels for each system.

These examples are shown only for the purpose of illustrating the bitterness suppression characteristics of autolyzed yeast and should not be construed as limiting the scope of this invention, which is defined by the following claims.

I claim:

1. A sodium-free salt substitute comprising potassium chloride and an amount of autolyzed yeast effective to reduce the bitterness caused by the potassium chloride.

2. A food product to which a sodium-free potassium chloride-comprising salt substitute has been added, said food product further comprising an amount of autolyzed yeast effective to substantially reduce bitterness caused by the presence of the potassium chloride.

3. A food product containing the salt substitute of claim 2.

4. The food product of claim 3 wherein the amount of autolyzed yeast relative to the amount of potassium chloride on a weight percent basis is from about 0.5 percent to about 300 percent.

5. A food product to which a sodium-free potassium chloride-containing salt substitute has been added, said food product further containing an amount of autolyzed yeast effective to substantially reduce bitterness caused by the presence of the potassium chloride.

6. The food product of claim 5 wherein the yeast is *Candida utilis*.

7. The food product of claim 6 wherein the amount of autolyzed yeast relative to the amount of potassium chloride on a weight percent basis is from about 0.5 percent to about 300 percent.

* * * * *

UNITED STATES PATENT OFFICE
CERTIFICATE OF CORRECTION

Patent No. 4,297,375                                Dated October 27, 1981

Inventor(s) John R. Shackelford

It is certified that error appears in the above-identified patent and that said Letters Patent are hereby corrected as shown below:

| Patent Column | Line | |
|---|---|---|
| 6<br>Claim 2 | 19-23 | Claim 2 "A food product to which a sodium-free potassium chloride-comprising salt substitute has been added, said food product further comprising an amount of autolyzed yeast effective to substantially reduce bitterness caused by the presence of the potassium chloride." Should read --The salt substitute of Claim 1 wherein the yeast is Candida utilis.-- |
| 6<br>Claim 5 | 31 | "chloride-containing" should read --chloride-comprising-- |
| 6<br>Claim 5 | 32 | "containing" should read --comprising-- |

Signed and Sealed this

Ninth Day of November 1982

[SEAL]

Attest:

GERALD J. MOSSINGHOFF

Attesting Officer    Commissioner of Patents and Trademarks